United States Patent [19]

Tachibana et al.

[11] 4,105,090
[45] Aug. 8, 1978

[54] MUFFLER FOR EXHAUST GASES

[75] Inventors: Histaro Tachibana; Hisashi Fujii; Tamotsu Sezaki, all of Akashi, Japan

[73] Assignee: Kawasaki Jukogyo Kabushiki Kaisha, Hyogo, Japan

[21] Appl. No.: 712,573

[22] Filed: Aug. 9, 1976

[30] Foreign Application Priority Data

Aug. 9, 1975 [JP] Japan .................... 50.110028

[51] Int. Cl.² .................................. F01N 7/10
[52] U.S. Cl. .................................. 181/265; 181/272; 181/281; 181/282
[58] Field of Search ............... 181/212, 231, 240, 252, 181/282, 258, 266, 267, 265, 269, 256, 272, 273, 274, 275

[56] References Cited

U.S. PATENT DOCUMENTS

| 1,326,647 | 12/1919 | Cotton et al. | 181/258 |
| 1,803,415 | 5/1931 | Hoorn | 181/265 |
| 2,853,148 | 9/1958 | Billey | 181/265 |
| 3,889,776 | 6/1975 | Postma | 181/258 |

Primary Examiner—L. T. Hix
Assistant Examiner—Benjamin R. Fuller
Attorney, Agent, or Firm—Sughrue, Rothwell, Mion, Zinn and MacPeak

[57] ABSTRACT

A muffler for exhaust gases is constructed with a small casing skirting a portion of an exhaust gas inlet pipe. The end of the casing nearest the exit port of the pipe is blocked and provided with a layer of sound absorbing material. The exhaust gases exiting the pipe turn within the layer and flow back up the outside of the pipe inside the casing and exit at a point near the upper end of the casing. The structure has sound arresting properties, particularly for high frequency sounds.

5 Claims, 4 Drawing Figures

MUFFLER FOR EXHAUST GASES

BACKGROUND OF THE INVENTION

This invention relates to an exhaust gas muffler, which does not lower the output of an engine to which it is connected and which can arrest high frequency components of exhaust sounds.

Uncomfortable and annoying sounds, to which attention should be paid in consideration of arresting exhaust sounds, are those at 600Hz and above. Attempts to arrest such high frequency sounds have included recourse to (1) absorption, (2) resonance (3) interference, and (4) filtration of the sound. In the practical application, however, a combination of the latter measures has been used for mufflers for exhaust gases. According to the prior art, sound-absorbing materials such as glass wool, steel wool and the like, are bonded to the inner surface of an exhaust passage within a muffler. However such techniques have failed to achieve an intended sound-absorbing purpose. According to another technique the direction of the exhaust gases is reversed to cause interference cancellation of sounds. In such case there tends to remain uncomfortable sounds of a high frequency as a result of the use of a hard impinging plate made of steel or the like.

SUMMARY OF THE INVENTION

According to the present invention, there is provided an exhaust gas muffler, which does not increase the fluid resistance of exhaust gases flowing through the exhaust system but which achieves improved efficiency in arresting high frequency sounds.

DETAILED DESCRIPTION OF THE INVENTION

Figure 1:
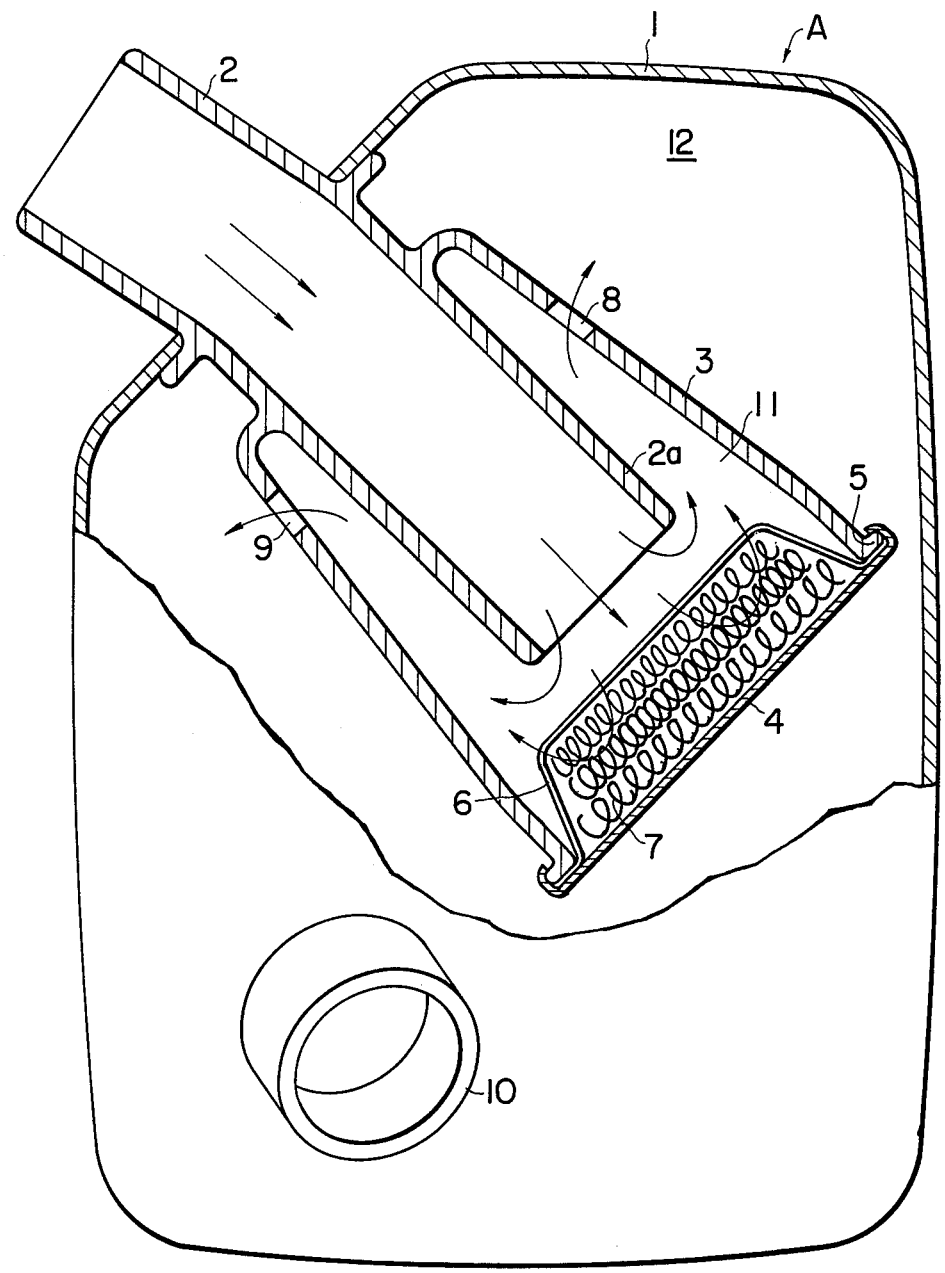
FIGS. 1 and 2 are transverse cross-sectional views of a muffler for exhaust gases according to the present invention.

Referring to FIG. 1, there is shown an outer casing 1 made of a fiber-reinforced plastic (FRP), an exhaust gas inlet pipe 2 made of an aluminum alloy casting, a small size casing 3 integral with a tip portion 2a of the exhaust gas inlet pipe 2 in surrounding relation thereto, an end plate 4 secured by caulking to a flange 5 formed on the tip portion of the small size casing 3, a wire net 6, steel wool 7. The small size casing 3 has an inversely tapered shape, which has cross sectional areas that are progressively increasing towards the flange 5 formed on its tip portion. A plurality of randomly positioned nozzles or openings 8, 9 having small diameters are provided in a portion of the small size casing, which surrounds the tip portion 2a of the exhaust gas inlet pipe 2. The wire net 6 is formed into a shape shown, beforehand, and contains steel wool therein, with its open edge being sandwiched between the end plate 4 and the flange 5. As has been described earlier, the end plate 4 is secured to the flange 5 by being caulked thereto. Also shown in FIG. 1 is an exhaust port 10 provided in the wall of the outer casing 1, and first and second sound-arresting chambers 11 and 12.

In operation, exhaust gases from an engine pass through the exhaust gas inlet pipe 2 and then from its tip portion 2a into the sound-arresting chamber 11 in the direction shown by the arrows. Then, the exhaust gases impinge on the steel wool 7, where components of sound having a high frequency are absorbed. In addition, when exhaust gases flow out through the tip portion 2a of the inlet pipe 2, the exhaust gases expand so that energy of the exhaust gases is consumed, while components of the sound having high freuqency are filtered. Exhaust gases, which have impinged on the steel wool, are reversed in their direction and pass through an annular space defined between the tip portion 2a of the inlet pipe 2 and the small casing 3, being compressed as they go toward the nozzles 8, 9 through a space defined between the output surface of the inlet pipe 2 and the inner surface of the small size casing 3, because of the inversely tapered shape of the casing 3. When the exhaust gases are discharged through the nozzles 8, 9 into sound arresting chamber 12, the exhaust gases expand and are diffused. At this time, as well, energy of the exhaust gases is consumed to a large extent according to filtration. Exhaust gases are then discharged from the sound arresting chamber 12 through an exhaust port 10 and a tail pipe connected to the exhaust port 10 to the atmosphere, or through the exhaust port 10 to the atmosphere, directly.

As is apparent from the foregoing description, exhaust gases including a large amount of high frequency components of sound impinge on the sound absorbing layer of the steel wool 7 disposed in the path of the gases as they turn from pipe 2a into casing 3. When exhaust gases flow through the inlet pipe 2 and expand in the small size casing 3, and then the exhaust gases change their direction high frequency components of the sound can be effectively absorbed. In addition, the small size casing 3 has an inversely tapered shape, so that the exhaust gases which have once expanded and have been diffused into the sound arresting chamber 11 are again compressed or throttled, followed by discharge through the nozzles 8, 9 outside, so that the exhaust gases are suitably subjected to expansion and compression, with the resulting elimination of high frequency components of sound. In addition to this, since there is no substance to produce a considerable fluid resistance in paths of exhaust gases, there results no increase in a back pressure, nor lowering of the output of the engine.

Figure 2:
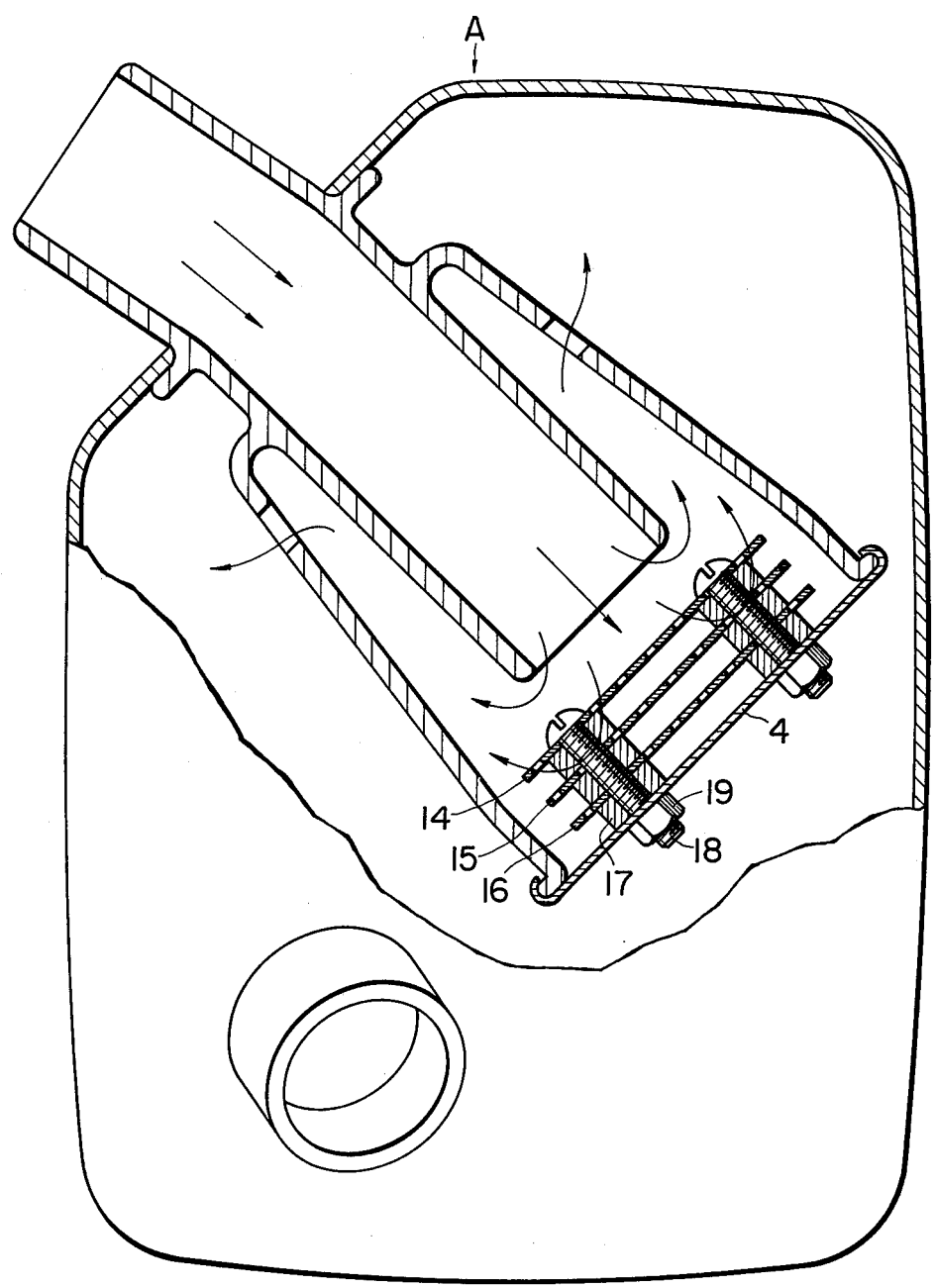

FIG. 2 shows another example of a sound absorbing layer of an exhaust gas impinging portion, in which there are shown three bunching plates 14, 15, 16 which are spaced a given distance from each other by means of spacer collars 17. A plurality of holes are located at random in each of the bunching plates 14 to 16, so that there is no possibility of exhaust gases impinging on the end plate 4, directly. Shown at 18 is a bolt and at 19 a nut. The collars 17 may be made of heat- resistance rubber, while the thicknesses of plates 14 to 16, and the shape, arrangement, number and the like of the holes provided therein may be varied, as required, thereby eliminating high frequency components of sound.

Figure 3:
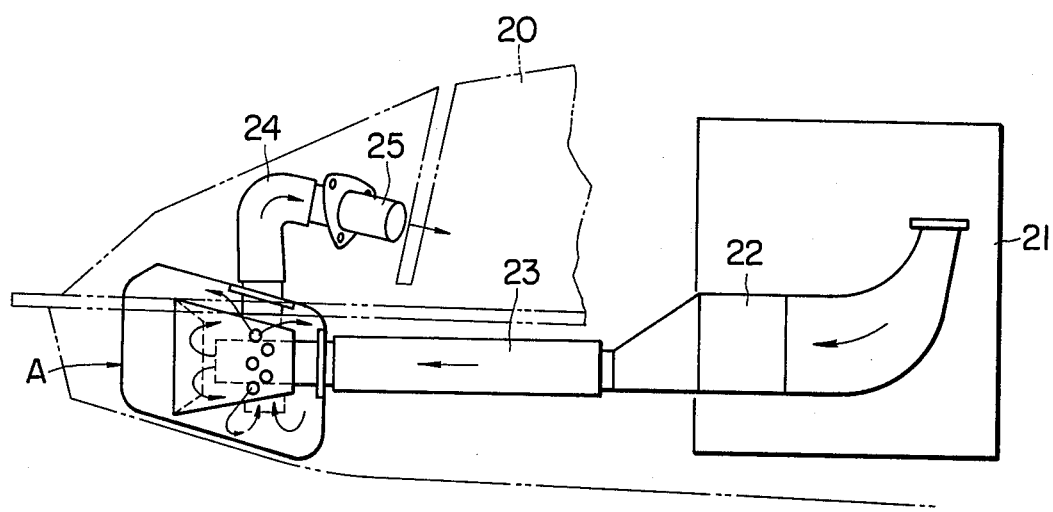
FIG. 3 is a side view of a jet ski, to which is applied a muffler according to the present invention.

In FIG. 3, which illustrates one exmaple of the application of a muffler according to the present invention, there is shown a hull 20 of a small size boat of the water-jet propelled type (jet ski), an engine 21, an engine muffler 22, a rubber tube 23, a muffler A of the type shown in FIGS. 1 and 2, a rubber tube 24, and a tail pipe 25 projecting out of the hull 20. Rubber tubes 23 and 24 are positioned upstream and downstream of the muffler A, respectively, thereby effectively eliminating high frequency components of sound. In the application shown in FIG. 3, engine cooling water is mixed with exhaust gases and such a mixture flows through the tubes, so that rubber tubes may be employed for such an application.

Figure 4:
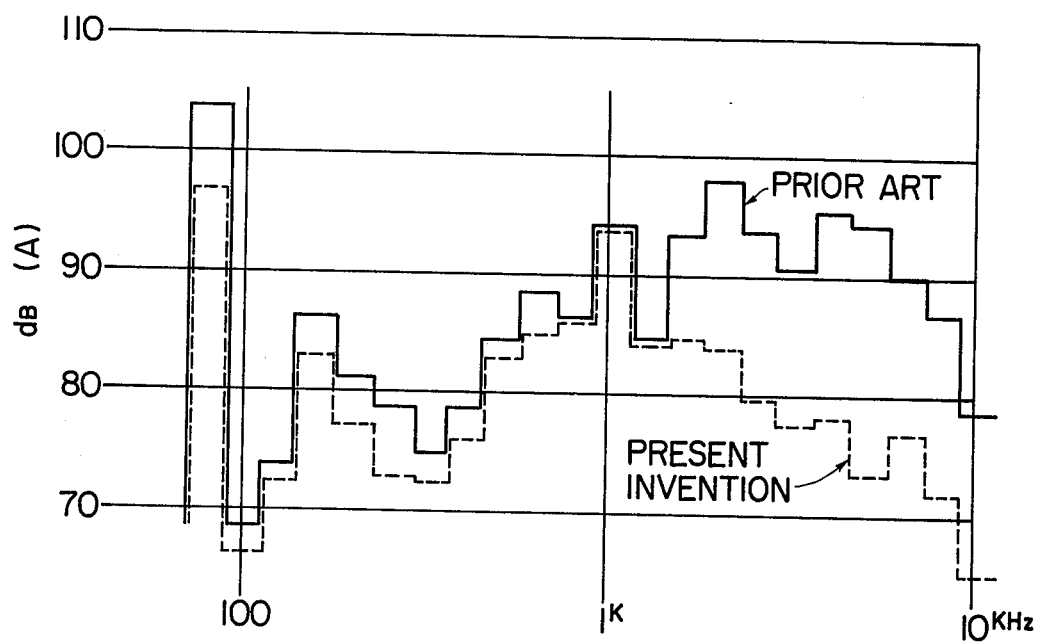
FIG. 4 is a graph showing test results conducted on the preferred embodiment, herein.

FIG. 4 shows the results of tests run on a jet ski having a muffler an exhaust system of the type shown in FIG. 3.

In one test, the results of which are shown by the broken line in FIG. 4, the muffler used at A was the one shown in FIG. 1 herein. In another test, the results of which are shown by the solid line, the muffler used differed from the one shown in FIG. 1 in that it did not have casing 3 and the sound absorbing layer 7. The graph is a plot of decibels versus frequency.

As is clear from the graph, the invention achieves a remarkable sound- arresting effect in the high frequency zone. The above test results were obtained by taking measurements at a position spaced a short distance from the tip of the tail pipe 25, shown in FIG. 3.

As is apparent from the foregoing, the muffler according to the present invention is simple in construction and provides remakable improvements in sound-arresting effects for exhaust gases. In addition, sources which increase the fluid resistance for paths of exhaust gases are minimized, so that there is no risk of lowering an output of an engine.

What is claimed is:

1. An exhaust gas muffler of the type having a muffler casing with an exhaust port, and an exhaust gas inlet pipe for passing exhaust gas from an engine into said muffler casing, the improvement characterized by:
    a small size casing attached to and surrounding the exhaust portion of said inlet pipe within said muffler casing, said small size casing having a cross sectional area which increases progressively from the point of attachment to a termination thereof downstream of the tip of said inlet pipe, an end plate having a sound absorbing material connected therewith positioned to close the termination end of said small size casing so that said sound absorbing material faces the output tip of said inlet pipe to receive exhaust gases as they exit said inlet pipe and make a turn to flow back up said small size casing, and nozzles provided in the wall of said small size casing surrounding said inlet pipe.

2. An exhaust gas muffler as claimed in claim 1 wherein said small size casing is integral with said inlet pipe.

3. An exhaust gas muffler as claimed in claim 1 wherein said absorbing material is steel wool.

4. An exhaust gas muffler as claimed in claim 1 wherein said absorbing material is a plurality of spaced baffle plates connected to said end plate and having random openings therein.

5. An exhaust gas muffler as claimed in claim 1 wherein said absorbing material is glass wool.

* * * * *